United States Patent [19]

Auinger et al.

[11] Patent Number: 5,294,857
[45] Date of Patent: Mar. 15, 1994

[54] SYNCHRONOUS MACHINE HAVING CONTROL COILS FOR COMPENSATING MECHANICAL OSCILLATIONS OF THE ROTOR

[75] Inventors: Herbert Auinger, Nürnberg; Hermann Waldmann, Weiher, both of Fed. Rep. of Germany

[73] Assignee: Siemens Aktiengesellschaft, Munich, Fed. Rep. of Germany

[21] Appl. No.: 859,694

[22] PCT Filed: Nov. 20, 1990

[86] PCT No.: PCT/EP90/01987
§ 371 Date: Jun. 10, 1992
§ 102(e) Date: Jun. 10, 1992

[87] PCT Pub. No.: WO91/10278
PCT Pub. Date: Jul. 11, 1991

[30] Foreign Application Priority Data

Dec. 22, 1989 [EP] European Pat. Off. ........ 89123789.3

[51] Int. Cl.⁵ .............................................. H02K 1/24
[52] U.S. Cl. ................................... 310/269; 310/162; 310/183; 310/198; 310/210
[58] Field of Search .................. 310/269, 162–165, 310/182, 183, 185–188, 124, 196, 197, 198, 210, 211, 219, 208, 261

[56] References Cited

U.S. PATENT DOCUMENTS

| 1,369,765 | 3/1921 | Alexander | 310/183 UX |
| 2,411,002 | 11/1946 | Rudenberg | 310/183 |
| 3,127,532 | 3/1964 | Gynt | 310/183 |
| 3,870,912 | 3/1975 | Kipke | 310/183 |
| 4,435,664 | 3/1984 | Boesel | 310/186 |
| 4,937,486 | 6/1990 | Schwanda | 310/269 |

FOREIGN PATENT DOCUMENTS

| 0268160 | 5/1988 | European Pat. Off. . | |
| 72949 | 4/1984 | Japan | 310/269 |
| 574821 | 9/1971 | U.S.S.R. | 310/269 |
| 1092653 | 5/1974 | U.S.S.R. | 310/269 |
| 1449803 | 9/1976 | United Kingdom . | |

OTHER PUBLICATIONS

Patent Abstracts Of Japan, vol. 8, No. 281, Dec. 21, 1984, & JP-A-59 148554 (Fuji Denki Seizo K.K.) Aug. 25, 1984.

Primary Examiner—R. Skudy
Attorney, Agent, or Firm—Kenyon & Kenyon

[57] ABSTRACT

In order to compensate for the effects of mechanical oscillations of the salient pole rotor in a synchronous machine in a simple manner, control coils are provided which generate a controllable quadrature-axis magnetic field. The control coils are arranged on the salient pole rotor in such a way that the quadrature-axis magnetic field generated by the control coils is superimposed in the air gap on the controllable direct-axis magnetic field generated by exciting coils enclosing each pole body of the salient pole rotor.

16 Claims, 2 Drawing Sheets

SYNCHRONOUS MACHINE HAVING CONTROL COILS FOR COMPENSATING MECHANICAL OSCILLATIONS OF THE ROTOR

BACKGROUND OF THE INVENTION

The present invention relates to a synchronous machine having a salient pole rotor.

A method and an arrangement for reducing at least one frequency component of a periodic pulsation is described in European Patent No. EP-A1-0 268 160. In this arrangement, a synchronous generator is driven by a drive motor. Particularly a high-power synchronous generator driven by a diesel engine, and pulsations of an electrical quantity are compensated at the output of the synchronous generator with a frequency that deviates from the synchronous generator's own frequency. The control is effected on the path formed by the diesel engine, generator and power system by intervening in the excitation of the generator (i.e., by controlling the direct-axis magnetic field) or by influencing the operating conditions of the diesel engine (quantity and timing of the fuel injection are controlled), or by an impedance (adjustable additional load) arranged at the output of the generator. These types of control are costly, since in some circumstances one of these measures is not sufficient by itself to achieve a complete compensation of the periodic pulsation.

An object of the present invention is to provide a synchronous machine of the type mentioned above, in which the effects of mechanical oscillations of the salient pole rotor, which can be attributed to influences both on the drive side and on the load side, are compensated in a simple manner.

SUMMARY OF THE INVENTION

In the synchronous machine of the present invention, in addition to the exciting coils which generate a controllable direct-axis magnetic field in a conventional manner, control coils are provided which generate a controllable quadrature-axis magnetic field. The control coils are arranged on the salient pole rotor in such a way that the quadrature-axis magnetic field generated by the control coils is superimposed on the direct-axis magnetic field in the air gap. Therefore, an additional intervention parameter is obtained for compensating the fluctuations caused by mechanical oscillations of the salient pole rotor on the electrical side.

As a result of the control of the quadrature-axis magnetic field simultaneously with the mechanical oscillations, a regularly rotating fundamental flux resulting from the direct-axis magnetic field and quadrature-axis magnetic field can be accomplished. Comparable operating conditions to those of a regularly rotating salient pole rotor are thus obtained, that is to say without oscillations.

The arrangement of these control coils is advantageous in high-power slow-running synchronous generators which are driven, for example, by diesel engines having an irregular torque. Until this time, generators of this type have had to be dimensioned in such a way that they have a correspondingly high mass moment of inertia, which is unfavorable with respect to costs and to weight and space requirements.

The quadrature-axis magnetic field generated by the control coils is superimposed on the direct-axis magnetic field. In order to achieve this, it is possible, to provide control coils which are arranged on additional poles designed in the manner of commutating poles. Apart from the constructional problems and the manufacturing outlay for such additional poles, with such an arrangement of the control coils, the pole pitch for the direct-axis magnetic field and hence the machine utilization (output for a given machine volume) would be reduced to a relatively high degree. Moreover, with the aforementioned arrangement it is not readily possible to achieve sufficiently high amplitudes for the quadrature-axis magnetic field.

In an embodiment of the synchronous machine of the invention, both a high pole pitch for the direct-axis magnetic field and a sufficiently high amplitude for the quadrature-axis magnetic field is ensured. By virtue of the arrangement of the control coils according to the invention, the quadrature-axis magnetic field essentially permeates only the pole shoes, that is to say only the upper pole region adjoining the air gap. The pole core and the yoke, on the other hand, carry only the direct-axis magnetic flux interlinked with the exciting coils. Such an arrangement experiences relatively rapid changes in the quadrature-axis magnetic field and hence rapid compensation of interfering oscillations of the salient pole rotor.

In a further embodiment of the present invention, at least one damper frame is arranged for each pole to compensate for dynamic changes of state as can occur, for example, with loading and unloading. The damper frames can be arranged symmetrically with the grooves holding the control coils.

In contrast to a conventional damper cage, these damper frames do not act on the quadrature-axis magnetic field. Accordingly, they also do not influence the compensation of the mechanical oscillations of the salient pole rotor effected by the quadrature-axis magnetic field. As a result of its effect on the quadrature-axis magnetic field, a damper cage should be employed in the synchronous machine of the invention only if the required control times for the quadrature-axis magnetic field are greater by at least one power of ten than the determinative subtransient time constants of the damper cage.

DETAILED DESCRIPTION

Figure 1:
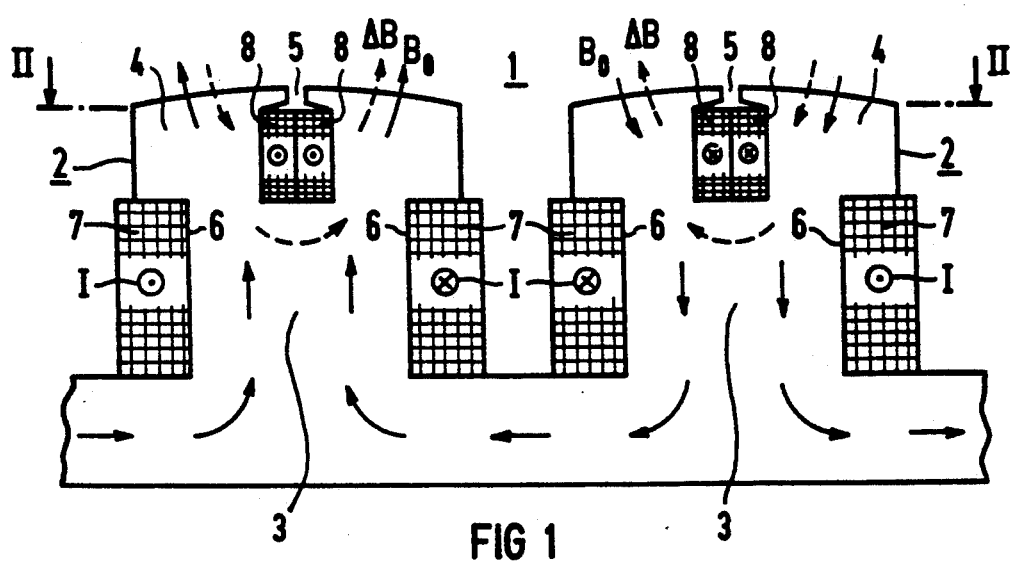
FIG. 1 is a cross section of an unwound salient pole rotor of the synchronous machine according to the invention.

In FIG. 1, reference numeral 1 denotes a salient pole rotor of a synchronous machine having poles 2 which comprise a pole body 3 and a pole shoe 4 placed thereon. Each pole shoe 4 has a groove 5 in its center which extends in the longitudinal axis of the salient pole rotor 1. Also, recesses 6 are provided on both longitudinal sides of each pole body 3 which extend parallel to the groove 5 in each case. Each pole body 3 of the salient pole rotor 1 is enclosed by an exciting coil 7 (see FIG. 2). The longitudinal sides of the exciting coils 7 are located in the two recesses 6 of a pole body 3.

In addition to these conventional exciting coils 7, the salient pole rotor 1 has control coils 8. In each case two longitudinal sides of the adjacent control coils 8 are located together in the groove 5 of the pole shoes 4. In each case, a control coil 8 encloses the adjacent pole shoe halves of two poles 2 (see FIG. 2).

The control coils 8 are fastened with, a stopper key in the grooves 5, bands, and/or supporting rings or supporting caps in the front-end region of the rotor.

Figure 2:
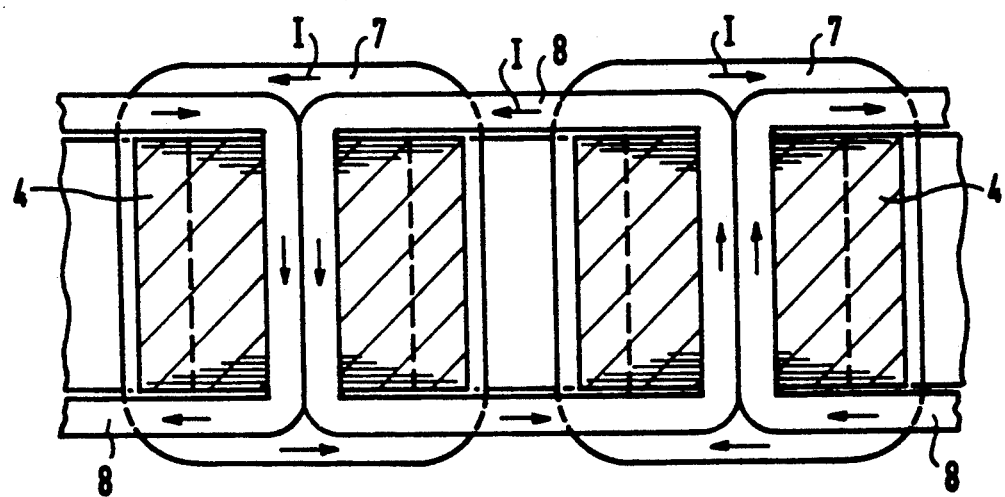
FIG. 2 is a cross section through the salient pole rotor of FIG. 1 along the line II—II.

In FIG. 1 the current direction flowing into the plane of the drawing is indicated by a cross. The current direction flowing out of the plane of the drawing is indicated by a dot. In FIG. 2 the direction of the current I is indicated by arrows. With the current directions illustrated in FIGS. 1 and 2, the magnetic flux curves of the salient pole rotor 1 represented in FIG. 1 are obtained. The exciting coils 7 generate the direct-axis magnetic field $B_o$ (solid arrows), while the control coils 8 generate the quadrature-axis magnetic field denoted by $\Delta B$ (dashed arrows).

Figure 3:
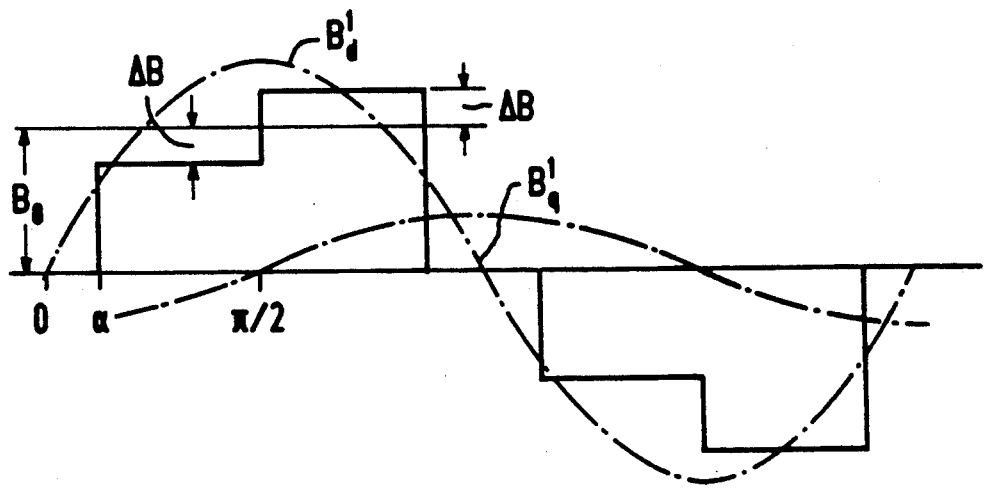
FIG. 3 is a line graph showing the direct-axis magnetic field and the quadrature-axis magnetic field in an idealized representation.

For the sake of simplicity in the following qualitative analysis, it is assumed that the direct-axis field $B_o$ generated by the exciting coils 7 has a rectangular waveform. Corresponding to this direct-axis field $B_o$ is the direct-axis field fundamental amplitude (shown in dashed lines in FIG. 3) $B_d^1 = B_{o\pi}^{4} \cos\alpha$, where $\alpha$ denotes the electrical angle of the pole tip (angular distance from the middle of the pole gap to the edge of the pole shoe 4).

The quadrature-axis magnetic field $\Delta B$ generated by the control coils 8 corresponds to a quadrature-axis field fundamental amplitude of $B_q^1 = \Delta B_\pi^{4}(1 - \sin\alpha)$. As a result of the quadrature-axis field $\Delta B$ superimposed on the direct-axis field $B_o$, the magnetic flux density is reduced in one pole half by $\Delta B$ (in each case the left pole shoe half in FIG. 1) and increased in the other half by $\Delta B$ (in each case the right pole shoe half in FIG. 1).

Given a pole-pitch factor of approximately 0.7, which is customary in practice (the corresponding electrical pole tip angle $\alpha$ is then approximately 27°), $B_q^1/B_d^1 \approx 0.6 \ \Delta B/B_o$ is obtained for the quotient of interest from quadrature-axis field and direct-axis field fundamental amplitude. For a quadrature-axis field that is 10% of the direct-axis field, that is to say $B_q^1 = 0.1 \ B_d^1$, a flux density deviation of $\Delta B/B_o \approx \pm 0.17$ is required. This achieves a displacement of the flux vector by the angle $\pm \arctan 0.1 \approx \pm 5.7°$.

Figure 4:
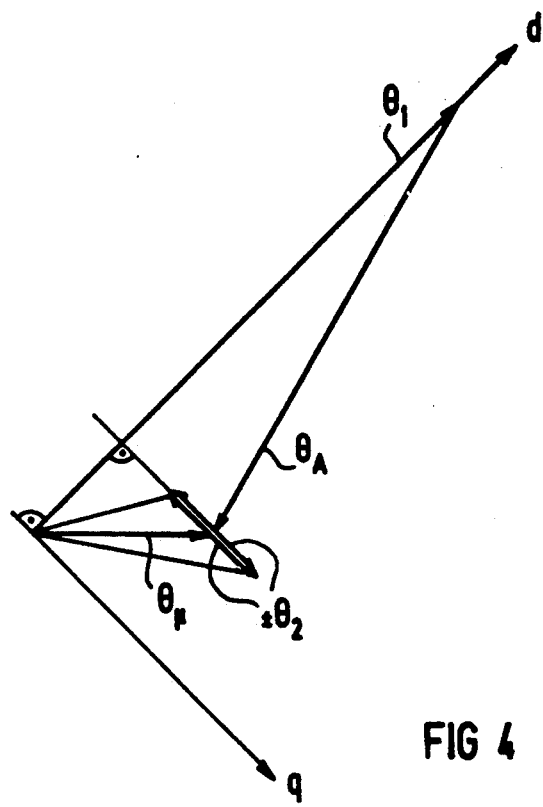
FIG. 4 is a magnetomotive force diagram of the synchronous machine according to the invention.

Given an unsaturated synchronous machine the quadrature-axis component of magnetomotive force $\theta_2$ of the control coil 8 required for a flux density deviation $\Delta B/B_o \approx \pm 0.17$ is thus approximately 17% of the magnetomotive force difference $\theta_\mu$, which corresponds to the vector sum of the direct-axis component of magnetomotive force $\theta_1$ and the armature reaction $\theta_A$ (see FIG. 4). Given a saturated magnetic circuit, the flux density on one pole shoe half decreases more than it increases at the same time on the other pole shoe half. For the resulting quadrature-field component of 10% described above, a slightly higher quadrature-axis component of magnetomotive force $\theta_2$ of the control coil 8 is expected of, for example, around 20% of the magnetomotive force difference $\theta_\mu$. In comparison to the overall direct-axis component of magnetomotive force $\theta_1$ of the exciting coil 7, the quadrature-axis component of magnetomotive force $\theta_2$ of the control coil 8 required for the quadrature-axis field is relatively small—see FIG. 4. The principal component of the direct-axis component of magnetomotive force $\theta_1$ is required for compensating the armature reaction $\theta_A$ caused by the current-carrying stator winding.

As FIG. 1 shows, the quadrature-axis field $\Delta B$ generated by the control coils 8 permeates essentially only the pole shoes 4 on the rotor side. The pole bodies 3 on the other hand carry only the direct-axis field $B_o$ interlinked with the exciting coils 7. An arrangement of this type experiences relatively rapid changes in the quadrature-axis field.

With regard to the electromagnetic compensation processes in the case of dynamic changes of state, for example in the case of load surges, a damper cage should only be provided if the required control time for the quadrature-axis field $\Delta B$ is greater by at least a power of ten than the determinative subtransient time constants of the compensation processes in the synchronous machine. Given conventional machine dimensions, these subtransient time constants are in the order of magnitude of 10 to 50 msec.

Figure 5:
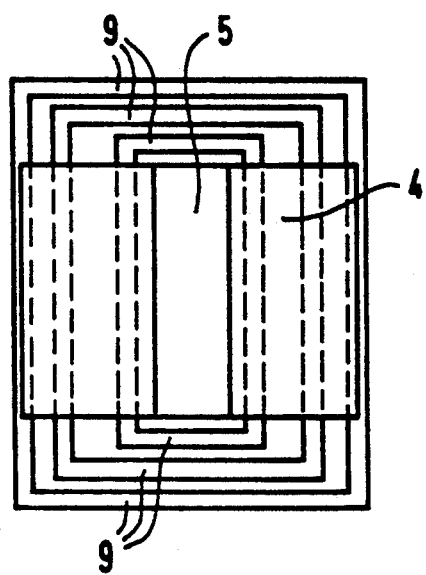
FIG. 5 is a pole shoe of the salient pole rotor according to FIG. 2 with damper frame and without coils (section II—II as in FIG. 2).

If the required control time is of the same order of magnitude (as the subtransient time constant) however, then at least one damper frame 9 can be advantageously provided on each pole shoe 4 in the synchronous motor according to the invention for damping compensation processes. Such a damper frame 9 acts only on the direct-axis magnetic field $B_o$ and hence does not influence the control behavior for the quadrature-axis magnetic field $\Delta B$. According to FIG. 5 the damper frames 9 are arranged symmetrically with the grooves 5. The damper frames 9 are expediently attached to the pole shoes 4 before insertion of the control coils 8.

The constructional design of the invention can be varied from those shown in the drawing in a variety of ways. For example, instead of one groove 5 in the center of the pole in each case, a plurality of grooves may be present to accommodate a control winding that is correspondingly spatially distributed. The damper frames 9 are expediently spatially placed at the front ends of the poles in such a way that they are already completed in the unwound state and permit a subsequent insertion of the windings 7 and 8.

In addition to control as a function of the mechanical oscillations the magnetic field is controlled as a function of the mechanical oscillations of the salient pole rotor to achieve a regularly rotating fundamental flux resulting direct-axis magnetic field and quadrature-axis magnetic field, the quadrature-axis field control according to the invention can also be advantageously employed for other control tasks such as, for example, supply-side active load oscillations or wind power stations.

We claim:

1. A synchronous machine, comprising:
   a salient pole rotor including a plurality of individual poles, each pole comprising a pole body, and a pole shoe, each pole shoe comprising first and second halves;
   a plurality of exciting coils, each of said exciting coils encircling one of said individual poles in said salient pole rotor, each of said exciting coils capable of conducting electric current and generating a controllable direct-axis magnetic field, and
   a plurality of control coils, each of said control coils coupled within poles shoes of adjacent individual poles in said salient pole rotor, each of said control coils capable of conducting electric current and generating a controllable quadrature-axis magnetic field, quadrature-axis and direct-axis magnetic fields flow in equivalent directions over the first half of each of said pole shoes and in opposite directions over the second half of each of said pole shoes.

2. The synchronous machine of claim 1, wherein said salient pole rotor is capable of being rotated about an axis, and each of said pole shoes in the poles of said salient pole rotor comprises:
a groove extending parallel to the axis of said salient pole rotor, said groove capable of receiving said control coils such that each of said control coils is coupled within grooves of adjacent poles in said salient pole rotor.

3. The synchronous machine of claim 2, wherein each of said grooves are centered within said pole shoes.

4. The synchronous machine of claim 1, wherein each of the poles of said salient pole rotor comprises:
at least one damper frame coupled to said pole shoe such that said damper frame suppresses pulsating changes in magnitude only in said direct-axis magnetic field.

5. The synchronous machine of claim 2, wherein each of the poles of said salient pole rotor comprises:
at least one damper frame coupled to said pole shoe such that said damper frame suppresses pulsating changes in magnitude only in said direct-axis magnetic field.

6. The synchronous machine of claim 3, wherein each of the poles of said salient pole rotor comprises:
at least one damper frame coupled to said pole shoe such that said damper frame suppresses pulsating changes in magnitude only in said direct-axis magnetic field.

7. The synchronous machine of claim 5, wherein said damper frame is coupled symmetrically to said groove of said pole shoe.

8. The synchronous machine of claim 6, wherein said damper frame is coupled symmetrically to said groove of said pole shoe.

9. The synchronous machine of claim 1, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

10. The synchronous machine of claim 2, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

11. The synchronous machine of claim 3, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

12. The synchronous machine of claim 4, wherein said quadrature-axis magnetic field is capable of being controlled such that an amplitude of said quadrature-axis magnetic field is a unction of mechanical oscillations of the salient pole rotor, where combining said quadrature-axis and direct-axis magnetic fields results in a regularly rotating magnetic flux in said synchronous machine.

13. The synchronous machine of claim 5, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

14. The synchronous machine of claim 6, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

15. The synchronous machine of claim 7, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

16. The synchronous machine of claim 8, wherein said quadrature-axis magnetic field is capable of being controlled such that an amplitude of said quadrature-axis magnetic field is a function of mechanical oscillations of the salient pole rotor, where combining said quadrature-axis and direct-axis magnetic fields results in a regularly rotating magnetic flux in said synchronous machine.

* * * * *